US008249773B2

(12) United States Patent
Kawada et al.

(10) Patent No.: US 8,249,773 B2
(45) Date of Patent: Aug. 21, 2012

(54) VEHICLE AND ITS CONTROL METHOD

(75) Inventors: Norihiko Kawada, Toyota (JP);
Mitsugu Kikuchi, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/937,598

(22) PCT Filed: Aug. 20, 2009

(86) PCT No.: PCT/JP2009/003996
§ 371 (c)(1),
(2), (4) Date: Oct. 13, 2010

(87) PCT Pub. No.: WO2010/061498
PCT Pub. Date: Jun. 3, 2010

(65) Prior Publication Data
US 2011/0035101 A1 Feb. 10, 2011

(30) Foreign Application Priority Data

Nov. 27, 2008 (JP) ................... 2008-302314

(51) Int. Cl.
*G06F 7/00* (2006.01)

(52) U.S. Cl. ............. 701/36; 701/1; 701/22; 180/6.5; 180/7.1; 180/21; 180/65.1; 180/65.8; 297/423.28; 297/423.34; 297/423.36; 280/657

(58) Field of Classification Search ............. 701/1, 22, 701/36; 180/6.5, 7.1, 21, 65.1, 65.8, 25; 280/5.2, 638, 657, 658; 297/423.28, 423.34, 297/423.36
See application file for complete search history.

(56) References Cited

FOREIGN PATENT DOCUMENTS

| JP | 2000-514680 A | 11/2000 |
|----|---------------|---------|
| JP | 2001-519209 A | 10/2001 |
| JP | 2004-097408 A | 4/2004 |
| JP | 2004-129435 A | 4/2004 |
| JP | 2005-323692 A | 11/2005 |
| JP | 2006-001385 A | 1/2006 |
| JP | 2006-205839 A | 8/2006 |
| JP | 2007-237750 A | 9/2007 |
| JP | 2008-024305 A | 2/2008 |
| JP | 2008-263676 A | 10/2008 |

*Primary Examiner* — Khoi Tran
*Assistant Examiner* — Jamie Figueroa
(74) *Attorney, Agent, or Firm* — Kenyon & Kenyon LLP

(57) ABSTRACT

To provide a vehicle capable of performing a transition between a stable state and an inverted state with a simple structure. A vehicle in accordance with an aspect of the present invention is a vehicle that moves by inverted pendulum control, including a rider seat, a chassis, a right driving wheel, a left driving wheel, motors to rotationally drive the right driving wheel and the left driving wheel, a forward bar protruding forward beyond the chassis, a motor to rotational drive the forward bar, a footstep attached to the forward bar, and a control box to control the motor. The feet of a rider 80 are put on the footstep. The control box changes the vehicle to an inverted state by raising the footstep so that the footstep moves away from a ground, or changes the vehicle to a stable state by lowering the footstep so that the footstep comes into contact with the ground.

9 Claims, 7 Drawing Sheets

VEHICLE AND ITS CONTROL METHOD

This is a 371 national phase application of PCT/JP2009/003996 filed 20 Aug. 2009, claiming priority to Japanese Patent Application No. JP 2008-302314 filed 27 Nov. 2008, the contents of which are incorporated herein by reference.

TECHNICAL FIELD

The present invention relates to a vehicle and its control method, in particular, to a vehicle that moves by inverted pendulum control and its control method.

BACKGROUND ART

An inverted wheel type vehicle such as an inverted two-wheeled vehicle is typically controlled by driving left and right driving wheels to travel in such a manner that the position of the center of gravity is constantly corrected to maintain the stable state. Further, a configuration in which an inertial body disposed above the wheels is driven to stabilize the inverted state has been disclosed (Patent literature 1). In this inverted wheel type vehicle, the inertial body is slid and moved during the traveling. In this way, since the position of the center of gravity is swiftly moved vertically above the axle, the inversion can be stabilized. Further, a battery that is used to drive a motor is installed in the carriage main body. In an inverted wheel type vehicle like this, wheels are controlled according to an output from a gyroscopic sensor, for example, so that the inverted state is maintained. That is, it is necessary to control the wheels in the forward/backward direction so that the position of the center of gravity of the whole vehicle is located above the axle.

Further, a vehicle equipped with a strut to prevent the vehicle from toppling over has been disclosed (Patent literature 2). In this literature, the vehicle is prevented from toppling over by extending the strut diagonally forward and backward.

CITATION LIST

Patent Literature

Japanese Unexamined Patent Application Publication No. 2006-205839 Published Japanese Translation of PCT International Publication for Patent Application, No. 2000-514680

SUMMARY OF INVENTION

Technical Problem

In an inverted wheel type vehicle like this, the vehicle needs to be changed from a stable state to an inverted state. For example, assuming a case where a person rides on the vehicle, the getting on/off action by the person is preferably performed in the stable state. However, in the configuration in which a strut is extended as mentioned above, the vehicle requires space in front of and behind the driving wheels so that the strut can be extended. Because of this, it is very difficult to secure space in which the feet are placed when the rider sits down. That is, it is necessary to design the vehicle in such a manner that when the strut is extended, the strut does not touch the feet or other components. For example, in a case where the vehicle is equipped with a footstep to support rider's feet, the footstep interferes with the strut. As a result, the designing becomes very difficult. Further, in the case of the configuration in which the position of a driving wheel(s) is changed, it requires a larger structure and an actuator(s), thus increasing the vehicle in size.

The present invention has been made to solve those problems, and an object thereof is to provide a vehicle capable of performing a transition between a stable state and an inverted state with a simple structure.

Solution to Problem

A vehicle in accordance with a first aspect of the present invention is a vehicle that moves by inverted pendulum control, including: a rider seat on which a rider rides: a chassis disposed below the rider seat; a wheel rotatably attached to the chassis; a first drive unit that rotationally drives the wheel; a forward movable bar protruding forward beyond the chassis; a second drive unit that rotationally drives the forward movable bar; a footstep attached to the forward movable bar, on which a foot of the rider is put; and a control unit that controls the second drive unit, wherein the control unit changes the vehicle to an inverted state by raising the footstep so that the footstep moves away from a ground, or changes the vehicle to a stable state by lowering the footstep so that the footstep touches the ground. In this way, the strut that extends forward or backward becomes unnecessary. Further, the riding quality can be improved. Therefore, the transition between the stable state and the inverted state can be performed with a simple structure.

A vehicle in accordance with a second aspect of the present invention is the above-described vehicle, further including a backward movable bar protruding backward beyond the chassis, and a third drive unit that rotationally drives the backward movable bar. In this way, the transition between the stable state and the inverted state can be performed with a simple structure.

A vehicle in accordance with a third aspect of the present invention is the above-described vehicle, in which the control unit controls the second and third drive units such that the forward movable bar and the backward movable bar rotate in synchronization with each other. In this way, the transition between the stable state and the inverted state can be smoothly performed.

A vehicle in accordance with a fourth aspect of the present invention is the above-described vehicle, further including an assisting wheel rotatably provided in at least one of the forward movable bar and the backward movable bar. In this way, the transition between the stable state and the inverted state can be smoothly performed.

A vehicle in accordance with a fifth aspect of the present invention is the above-described vehicle, further including a stopper that restricts rotation of the footstep. In this way, the transition between the stable state and the inverted state can be smoothly performed.

A control method of a vehicle in accordance with a sixth aspect of the present invention is a control method of a vehicle that moves by inverted pendulum control, the vehicle including a rider seat on which a rider rides, a chassis disposed below the rider seat, and a wheel rotatably attached to the chassis, the control method including: rotationally driving a forward movable bar protruding forward from the chassis; and rotationally driving the forward movable bar, and thereby changing the vehicle to an inverted state by raising a footstep which is attached to the forward movable bar and on which a foot of the rider is put so that the footstep moves away from a ground, or changing the vehicle to a stable state by lowering the footstep so that the footstep touches the ground. In this way, the strut that extends forward or backward becomes unnecessary. Further, the riding quality can be improved.

Therefore, the transition between the stable state and the inverted state can be performed with a simple structure.

A control method of a vehicle in accordance with a seventh aspect of the present invention is the above-described control method, in which the vehicle further includes a backward movable bar protruding backward from the chassis, and when the vehicle is changed from a state where the forward movable bar and the backward movable bar are in contact with the ground to a state where the forward movable bar and the backward movable bar are away from the ground, the backward movable bar is rotationally driven in synchronization with rotational driving of the forward movable bar.

A control method of a vehicle in accordance with a eighth aspect of the present invention is the above-described control method, in which after the vehicle is brought into a backward inclined posture by driving the forward movable bar and the backward movable bar in synchronization with each other, the forward movable bar is moved away from the ground, and after the forward movable bar is moved away from the ground, the backward movable bar is moved from the ground by rotationally driving the backward movable bar while performing inverted pendulum control.

A control method of a vehicle in accordance with a ninth aspect of the present invention is the above-described control method, in which the vehicle further includes a backward movable bar protruding backward from the chassis, and when the vehicle is changed from a state where the forward movable bar and the backward movable bar are away from the ground to a state where the forward movable bar and the backward movable bar are in contact with the ground, the backward movable bar is rotationally driven in synchronization with rotational driving of the forward movable bar.

Advantageous Effects of Invention

An object of the present invention is to provide a vehicle capable of performing a transition between a stable state and an inverted state with a simple structure.

DESCRIPTION OF EMBODIMENTS

A vehicle in accordance with this exemplary embodiment is an inverted wheel type vehicle that moves by inverted pendulum control. The vehicle moves to a certain place by driving wheels touching the ground. Further, it can maintain the inverted state by driving the wheels according to an output from a gyroscopic sensor or the like. Furthermore, the vehicle moves according to an operation amount operated by an operator while maintaining the inverted state.

Figure 1:
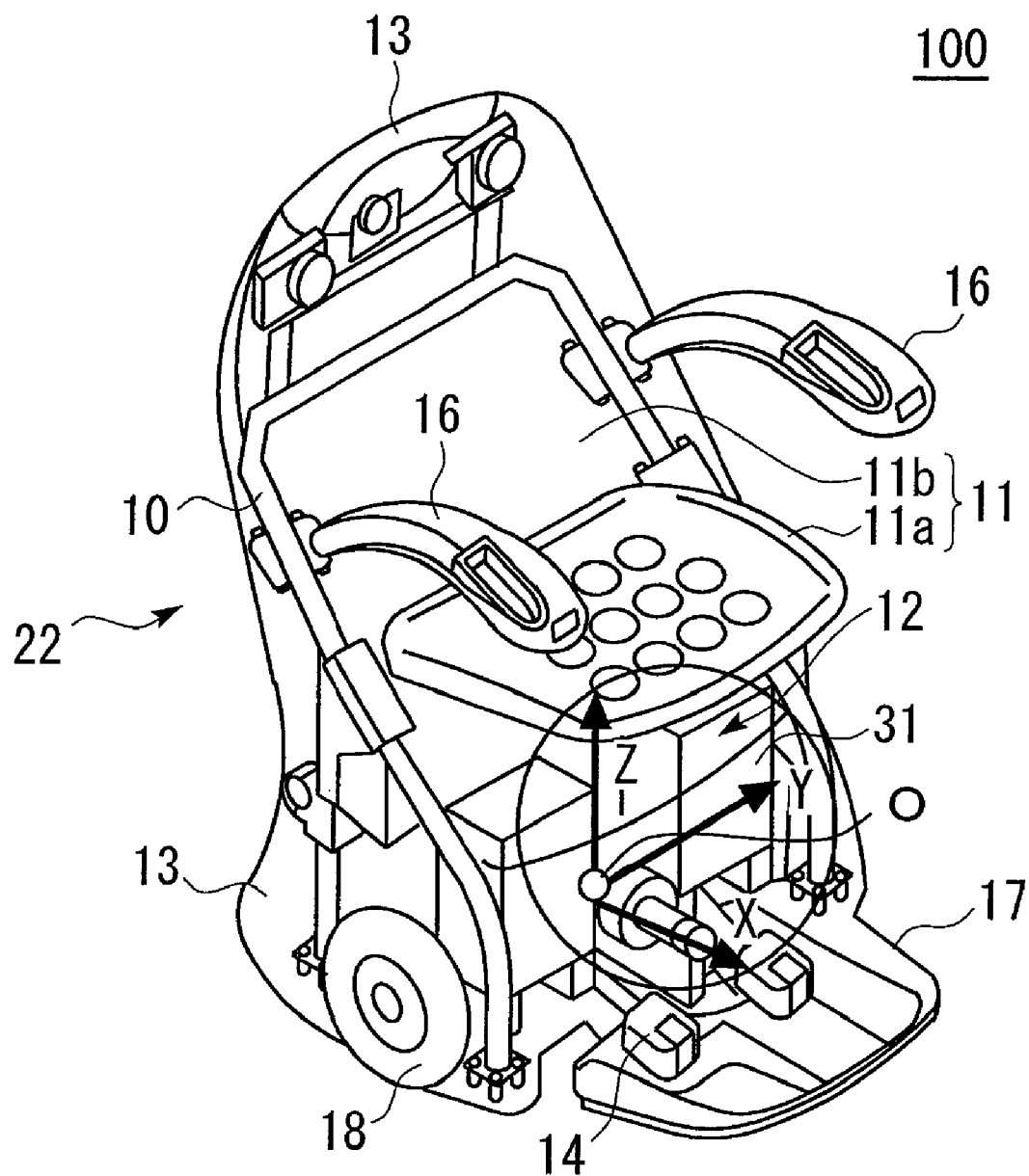
FIG. 1 is a front view showing a vehicle in accordance with an exemplary embodiment of the present invention.
Figure 2:
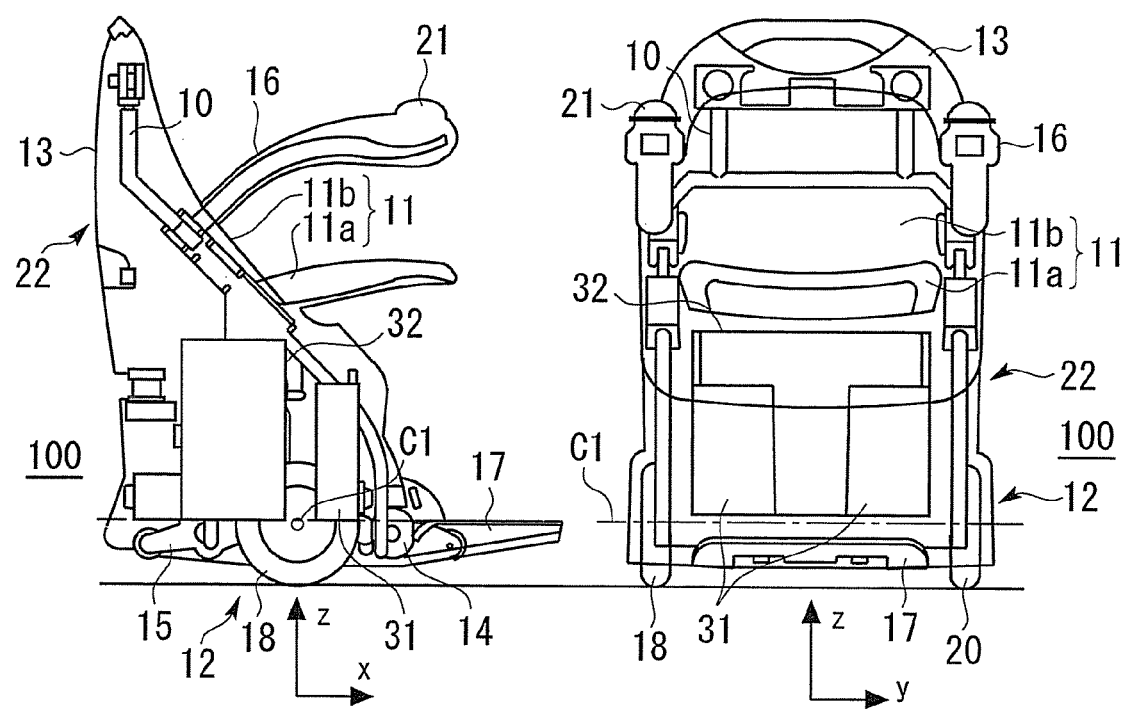
FIG. 2 shows a configuration of a vehicle in accordance with an exemplary embodiment of the present invention.
Figure 3:
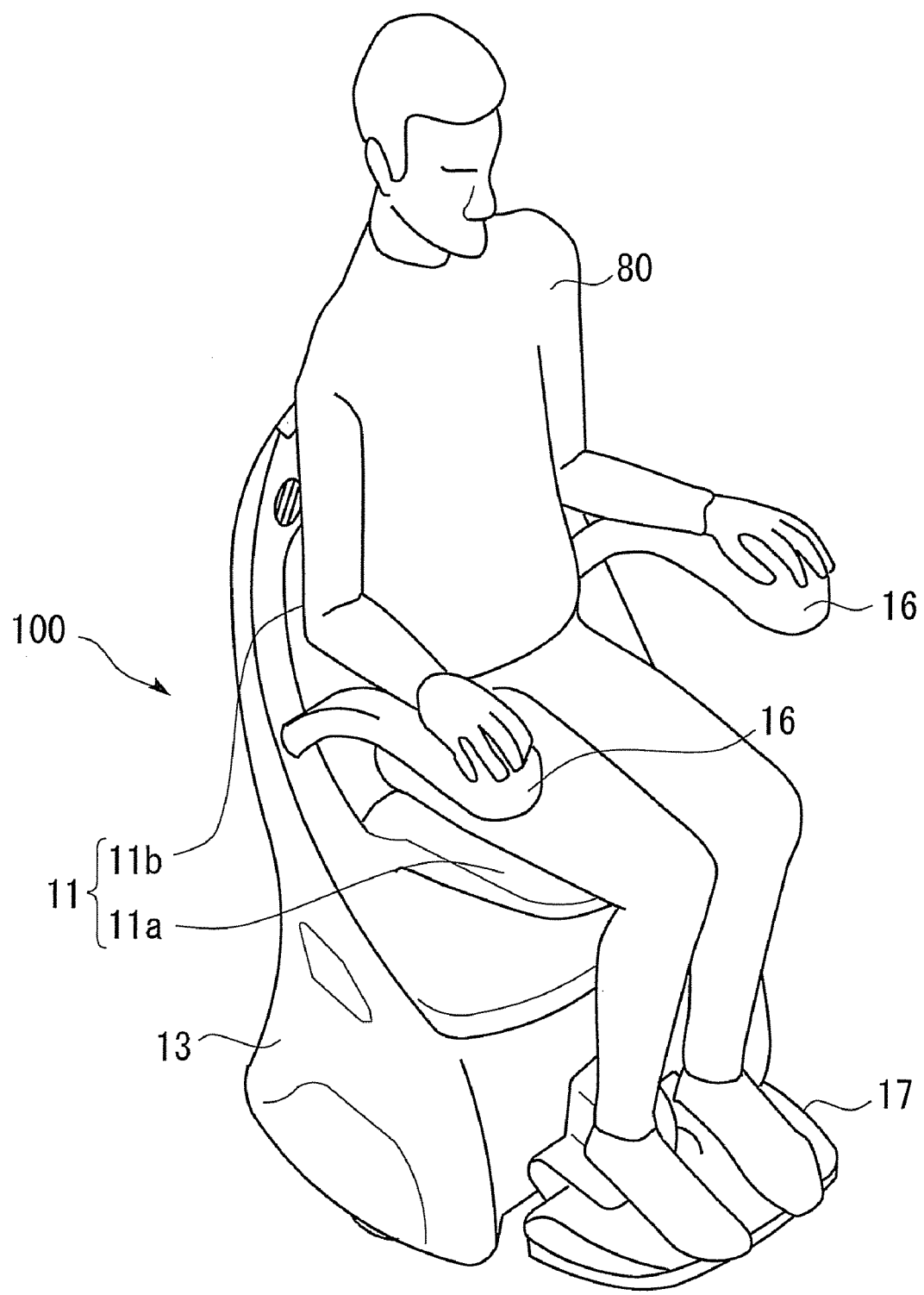
FIG. 3 is a perspective view showing a state where a rider rides on a vehicle.

A vehicle 100 in accordance with this exemplary embodiment is explained with reference to FIGS. 1 to 3. FIG. 1 is a perspective view schematically showing a configuration of the vehicle 100, and FIG. 2 schematically shows the configuration of the vehicle 100. In particular, a side view and a front view are shown on the left and right sides, respectively, of FIG. 2. FIG. 3 shows an aspect of the vehicle 100 with a rider riding thereon. Note that as shown in FIGS. 1 and 2, the forward direction of the vehicle 100 is defined as "+X direction", and the left direction is defined as "+Y direction". Further, the upward direction is defined as "+Z direction". Furthermore, to clarify the explanation, some structures are drawn in such a manner that components located behind them can be seen therethrough in FIGS. 1 and 2.

The vehicle 100, which is an inverted wheel type vehicle (traveling body), includes a right driving wheel 18 and a left driving wheel 20 arranged on the same axis as shown in FIG. 2. Note that the rotation axis of the right driving wheel 18 and the left driving wheel 20 is defined as "axle C1". The vehicle 100 includes a rider seat 11 on which a rider rides. Therefore, the vehicle 100 is a riding-while-seated type mobility robot with which a person can travel in a seated state. Further, the vehicle 100 can also move without any person riding thereon. For example, when a user who wants to ride on the vehicle 100 operates the vehicle 100 by remote control, it moves to the place where the user is. For example, when a user pushes a call button or the like, the vehicle 100 moves to the vicinity of the user. Then, after the vehicle 100 moves to the front of the user, the user gets on the vehicle 100.

The vehicle 100 is equipped with a frame 10 that serves as a framework structure of the vehicle 100. The frame 10 is composed of light aluminum pipes and the like. Further, a cover 13 covering the frame 10 is provided. The cover 13 also covers a chassis 12, which is described later. The vehicle 100 is also provided with a rider seat 11 having a chair-like shape. The rider seat 11 is fixed to the cover 13 and the frame 10. The frame 10 and the cover 13 are bent along the shape of the rider seat 11.

The rider seat 11 includes a seat 11a and a seat back 11b. Since the seat 11a serves as a seat on which a rider 80 sits, the seat 11a is horizontally disposed. Since the rider 80 sits on the seat 11a, the vehicle 100 can moves with the rider 80 riding thereon as shown in FIG. 3. The seat back 11b is formed so as to extend in a diagonally backward direction and serves as a backrest for supporting the back of the rider 80. Therefore, the vehicle 100 moves while the rider 80 leans on the seat back 11b.

The chassis 12 is disposed directly below the rider seat 11. The right driving wheel 18 and the left driving wheel 20 are attached to the chassis 12. The chassis 12 rotatably supports the right driving wheel 18 and the left driving wheel 20. The right driving wheel 18 and the left driving wheel 20 act as wheels (driving wheels) to move the vehicle 100. Each of the right driving wheel 18 and the left driving wheel 20 rotates around the axle C1. That is, the right driving wheel 18 and the left driving wheel 20 are arranged on the same axis. The chassis 12 is attached to the frame 10.

A motor(s) or the like (not shown) used to drive the right driving wheel 18 and the left driving wheel 20 is installed in this chassis 12. Further, since the vehicle 100 is an inverted wheel type vehicle, the vehicle body 22 (upper body portion) including the rider seat 11 and the like inclines around the axle C1. That is, the vehicle body 22 including the rider seat 11 and the like is rotatably supported. The vehicle body 22 serves as an upper body portion that rotates by using the axle C1 as the rotation center. In other words, the portion that inclines by using the axle C1 as the rotation center becomes the vehicle body 22. This vehicle body 22 includes the frame 10, the cover 13, the rider seat 11, and the like. Further, the vehicle body 22 may include a part or all of the chassis 12. In the inverted state, the inclination angle of the vehicle body 22 is changed by the driving of the right driving wheel 18 and the left driving wheel 20. The vehicle body 22 is equipped with a gyroscopic sensor or the like that is used to measure the inclination angle. Note that as shown in FIG. 1, the middle of the right driving wheel 18 and the left driving wheel 20 is defined as "coordinate center O". That is, the coordinate center O, which becomes the origin point of the coordinate system, is located on the axle C1. The traveling direction of the vehicle 100 is a direction perpendicular to the axle C1 on the horizontal plane.

A footstep 17 is provided in front of the chassis 12. The rider 80 steps on the footstep 17, and then sits on the rider seat 11. The footstep 17 is attached below the rider seat 11. Further, the footstep 17 extends ahead of the rider seat 11. As shown in FIG. 3, both feet of the rider 80 are put on the footstep 17. The footstep 17 is attached to the chassis 12.

Further, a forward bar 14 that is used to prevent the vehicle from toppling over is provided halfway through the footstep 17. Further, a backward bar 15 that is also used to prevent the vehicle from toppling over is provided behind the chassis 12. That is, with the forward bar 14, which is disposed in front of the axle C1, and the forward bar 14, which is disposed behind the axle C1, the vehicle can be prevented from toppling over forward or backward. The forward bar 14 protrudes forward from the chassis 12, while the backward bar 15 protrudes backward from the chassis 12. Therefore, when the vehicle inclines forward excessively, the tip of the forward bar 14 touches the ground, whereas when the vehicle inclines backward excessively, the tip of the backward bar 15 touches the ground.

The forward bar 14 and the backward bar 15 can be rotationally driven. The rotation axes of the forward bar 14 and the backward bar 15 are disposed below the axle C1 of the right driving wheel 18 and the left driving wheel 20 (−Z side). Further, an assisting wheel(s) is provided at the tip of each of the forward bar 14 and the backward bar 15. In the inverted state, the forward bar 14 and the backward bar 15 including their assisting wheels are located away from the ground. Further, at the timing when the rider 80 gets on/off the vehicle, the forward bar 14 and the backward bar 15 including their assisting wheels are in contact with the ground. Note that the unit structure of the forward bar 14 and the backward bar 15 is described later.

An armrest 16 is provided on each side of the rider seat 11. The armrests 16 are fixed to the frame 10 and/or the cover 13. Each of the armrests 16 extends forward from a position that is slightly lower than the elbow of the rider 80. The armrests 16 are disposed at a position higher than the seat 11a. Further, the armrests 16 are roughly parallel to the seat 11a. The armrests 16 are disposed on both sides, i.e., left and right sides of the rider seat 11. With this configuration, the rider 80 can put both his/her arms on the armrests 16. The armrests 16 are attached in the middle stage of the seat back 11b. As shown in FIG. 3, the rider 80 can put both his/her arms on the armrests 16 while being seated.

Further, an operation module 21 is provided in the armrests 16. In this example, the operation module 21 is mounted on the right-side armrest 16. Further, the operation module 21 is attached on the front-end side of the armrest 16. In this way, since the operation module 21 is disposed at a position at which the right hand of the rider 80 is located, the operability can be improved. The operation module 21 is equipped with an operation lever (not shown) and a brake lever (not shown). The operation lever is an operation member that is used by the rider 80 to adjust the traveling speed and the traveling direction of the vehicle 100. The rider 80 can adjust the traveling speed of the vehicle 100 by adjusting the operation amount of the operation lever. Further, the rider 80 can also specify the traveling direction of the vehicle 100 by adjusting the operation direction of the operation lever. The vehicle 100 can perform a forward movement, a stopping action, a backward movement, a left turn, a right turn, a left rotation, and a right rotation according to the operation applied to the operation lever. The rider 80 can put a brake on the vehicle 100 by tilting the brake lever. Needless to say, the operation module 21 may be mounted on the left-side armrest 16, or may be mounted on both of the armrests 16. Further, the operation module 21 may be mounted on a component other than the armrests 16.

A battery 31 and a control box 32 are installed in the chassis 12. The positions of the battery 31 and the control box 32 are changed forward and backward with respect to the axle C1 according to the inclination angle of the vehicle body 22. The battery 31 and the control box 32 are mounted on a base plate provided in the chassis 12. Therefore, the battery 31 and the control box 32 are located directly below the seat 11a. In this example, two batteries 31 are disposed in front of the control box 32. These two batteries 31 are arranged along Y-direction. Each of the batteries 31 is a secondary battery capable of being charged and discharged. The charging and discharging of the batteries 31 are controlled by the control box 32.

The control box 32, which includes a CPU (Central Processing Unit), a ROM (Read Only Memory), a RAM (Random Access Memory), a communication interface, and the like, controls various operations of the vehicle 100. Further, this control box 32 performs various controlling processes in accordance with a control program stored, for example, in the ROM. The control box 32 controls the motors and the like according to an operation made at the operation module 21 by using widely-known feedback control such as robust control, state feedback control, and PID control so that a desired acceleration and a target speed can be attained and that the vehicle 100 can maintain the inverted state. In this way, the vehicle 100 travels while accelerating or decelerating according to an operation made at the operation module Further, the battery 31 and the control box 32 are disposed above the axle C1. The battery 31 is disposed in front of the axle C1 (+X side) while the control box 32 is disposed behind the axle C1 (−X side). In this example, the control box 32 and the battery 31 are disposed away from each other. That is, the battery 31 and the control box 32 are disposed opposing each other with certain space therebetween directly above the axle C1. By disposing the battery 31 in front of the axle C1, the position of the center of gravity of the vehicle body 22 can be easily brought directly above the axle C1. Regardless of the presence/absence of the rider 80, the position of the center of gravity is located roughly directly above the axle C1 at the same inclination angle.

Figure 4:
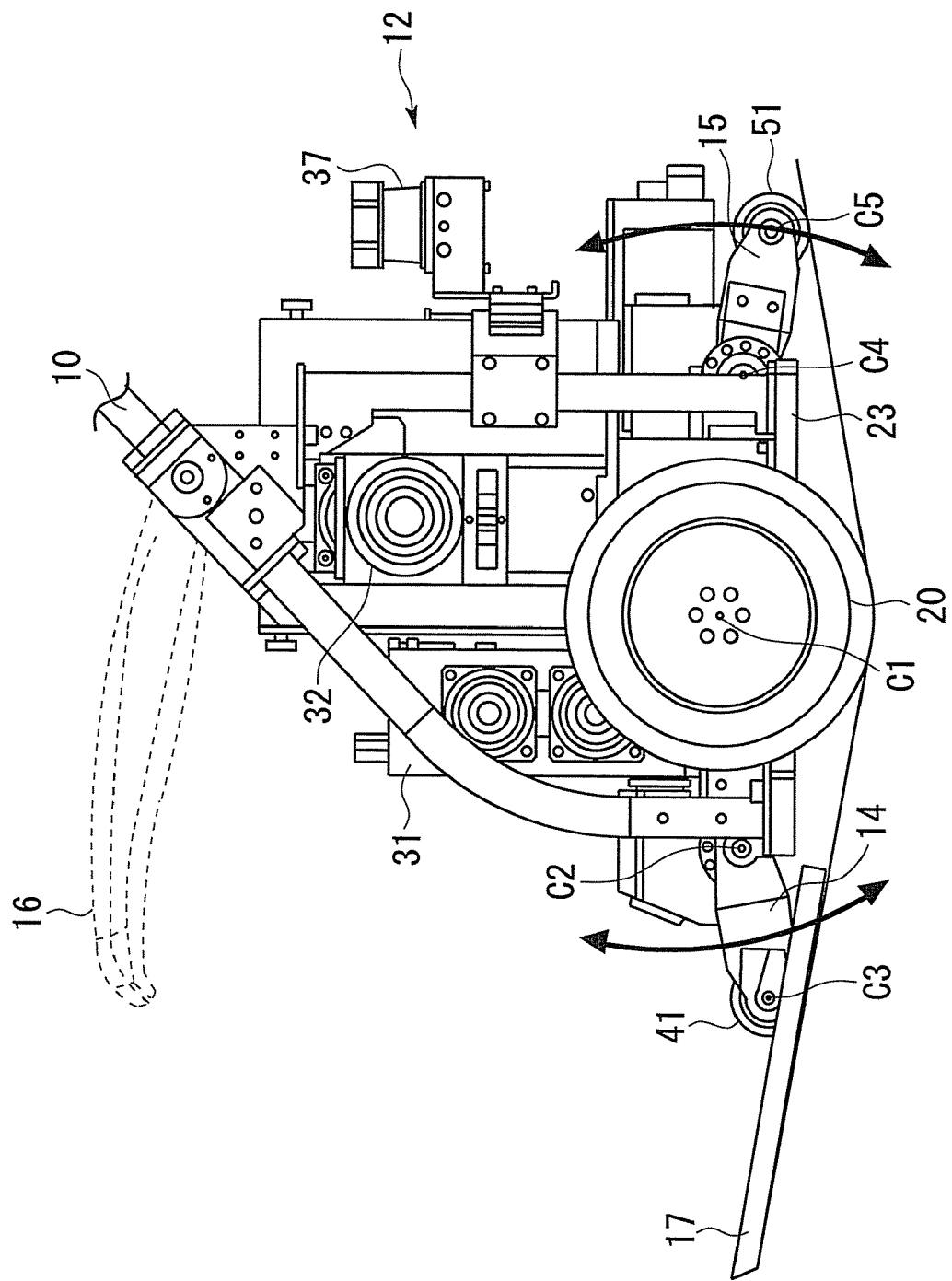
FIG. 4 is a side view showing a configuration of a chassis provided in a vehicle in accordance with an exemplary embodiment of the present invention.

Next, the configuration of the chassis 12 is explained with reference to FIG. 4. FIG. 4 is a side view showing a configuration of the chassis 12. A base plate 23 is provided in the chassis 12. A battery 31 and a control box 32 are mounted on this base plate 23. For example, a battery pack(s) is contained in the battery 31. Further, a CPU and the like are contained in the control box 32. This base plate 23 is provided in such a manner that the base plate 23 can rotate with respect to the axle C1. That is, when the angle of the upper surface of the base plate 23 is inclined with respect to the ground surface, the posture of the vehicle 100 is changed. Further, the frame 10 is attached to the base plate 23. The frame 10 extends upward from both ends of the base plate 23. Further, armrests 16 are provided on and extend from the frame 10. Further, a laser sensor 37, which is used to detect an obstacle located behind the vehicle, is installed in the chassis 12.

A forward bar 14 is provided on the front side of the base plate 23. The forward bar 14 protrudes forward from the base plate 23. The forward bar 14 is rotationally driven on a drive shaft C2. A front assisting wheel(s) 41 is supported at the rip of the chassis 12. The front assisting wheel 41, which is a trailing wheel, rotates on a rotation axis C3. Further, a footstep 17 is attached in front of the forward bar 14. The tip of the footstep 17 is disposed ahead of the tip of the forward bar 14, i.e., the front assisting wheel 41.

Further, a backward bar 15 is provided on the rear side of the base plate 23. The backward bar 15 is rotationally driven on a drive shaft C4. A rear assisting wheel(s) 51 is rotatably supported at the rear end of the backward bar 15. The rear assisting wheel 51, which is a trailing wheel, rotates on a rotation axis C5. As described above, the forward bar 14 and the backward bar 15 swing with respect to the base plate 23 in the direction indicated by the arrows.

Figure 5:
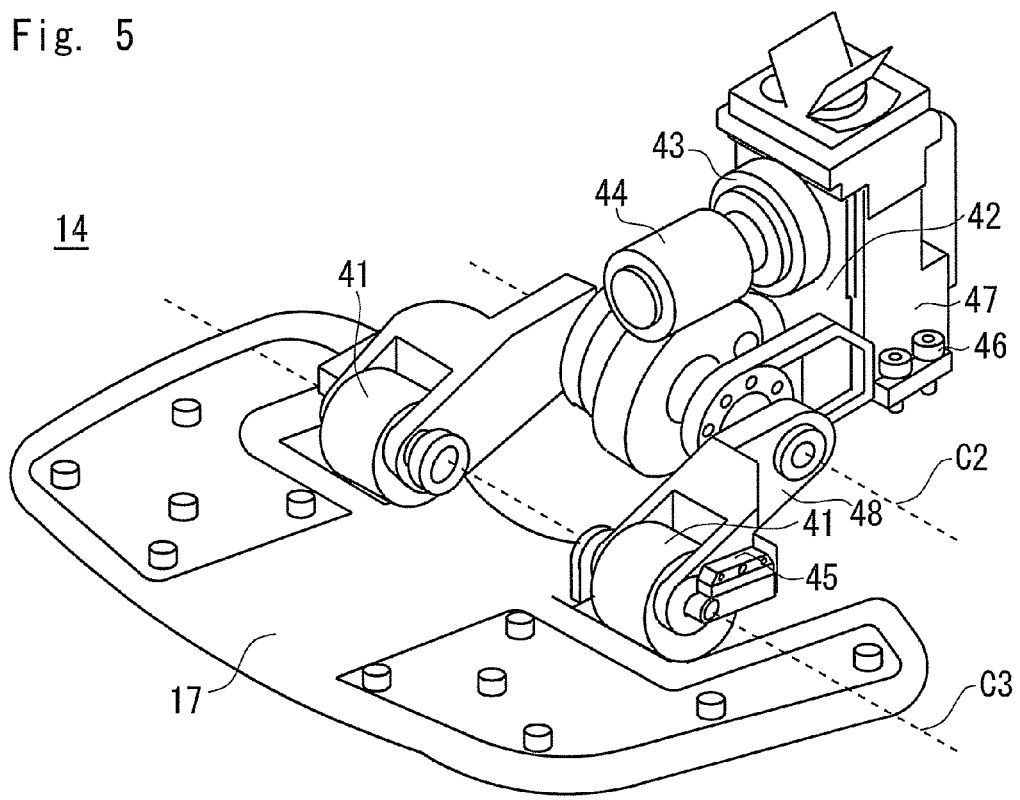
FIG. 5 is a perspective view showing a unit structure of a forward bar provided in a vehicle.
Figure 6:
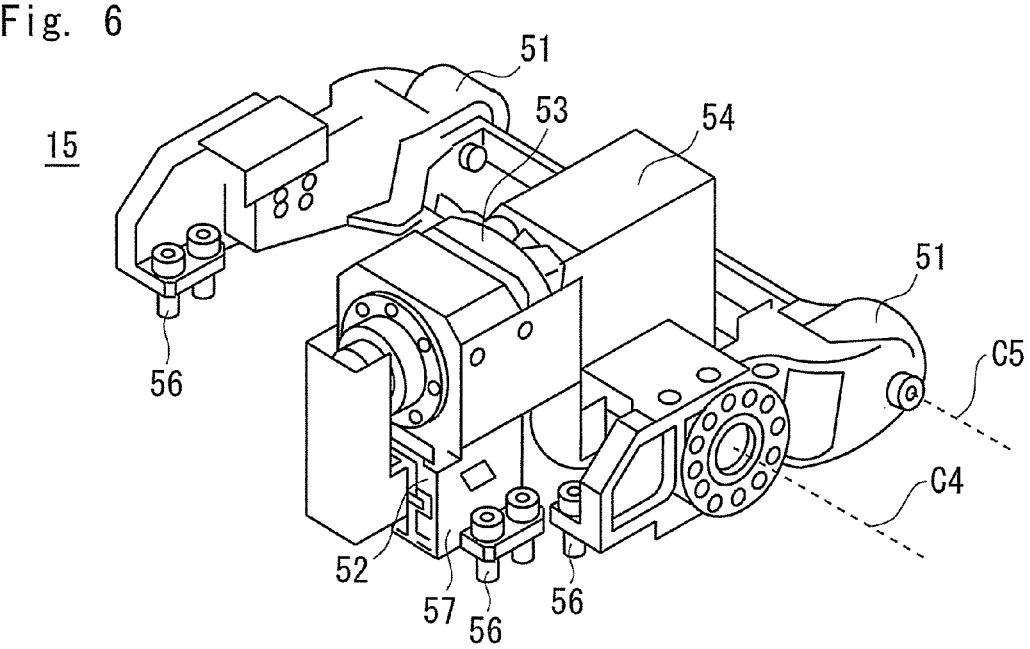
FIG. 6 is a perspective view showing a unit structure of a backward bar provided in a vehicle.

Next, the configuration of the forward bar 14 and the backward bar 15 is explained with reference to FIGS. 5 and 6. FIG. 5 is a perspective view showing a unit structure of the forward bar 14, and FIG. 6 is a perspective view showing a unit structure of the backward bar 15.

Firstly, the unit of the forward bar 14 is explained. In the unit of the forward bar 14, front assisting wheels 41, a motor 42, a speed reducer 43, a worm gearwheel 44, a stopper 45, bolts 46, a base 47, movable bars 48 are provided.

The bolts 46 fixes the base 47 to the base plate 23. That is, the base 47 is placed on the base plate 23 by the bolts 46. The motor 42, which is used to drive the movable bars 48, is provided on the base 47. The motor 42 is coupled to the speed reducer 43. The speed reducer 43 is coupled to the worm gearwheel 44. The worm gearwheel 44 rotatably supports the movable bars 48. The driving force from the motor 42 is transferred to the movable bars 48 through the speed reducer 43 and the worm gearwheel 44. In this way, the movable bars 48 are rotationally driven around the drive shaft C2. The drive shaft C2 is parallel to Y-direction. The angle of the movable bars 48 with respect to the base 47 is changed. In this example, the movable bars 48 are disposed on both sides of the worm gearwheel 44. That is, the movable bars 48 are attached on +Y side and −Y side of the worm gearwheel 44.

Further, the front assisting wheels 41 for preventing toppling-over are attached at the tip of the movable bar 48. In this example, two front assisting wheels 41 that are disposed away from each other in Y-direction are provided. The front assisting wheels 41 rotate around the rotation axis C3. The rotation axis C3 is parallel to Y-direction. Even when the vehicle 100 inclines forward excessively, the vehicle 100 is prevented from toppling over in the forward direction because the front assisting wheel 41 touches the ground. Further, the distance between the front assisting wheels 41 and the ground surface is changed by rotating the movable bars 48 around the drive shaft C2 while the vehicle is traveling in the inverted state. For example, when the movable bars 48 are rotated downward, the distance between the front assisting wheels 41 and the ground surface becomes shorter, whereas when the movable bars 48 are rotated upward, the distance between the front assisting wheels 41 and the ground surface becomes longer. Of the rotational directions of the movable bars 48, the direction with witch the distance between the front assisting wheels 41 and the ground surface becomes shorter is defined as "approaching direction", and the direction opposite to that direction is defined as "separating direction". That is, the approaching direction is the direction along which the front-end side of the movable bar 48 (front assisting wheel 41 side) moves downward with respect to the base side (worm gearwheel 44 side). The separating direction is the direction along which the front-end side of the movable bar 48 (front assisting wheel 41 side) moves upward with respect to the base side (worm gearwheel 44 side).

The footstep 17 is attached to the movable bars 48. The footstep 17 is rotatably supported on the movable bars 48. In this example, the footstep 17 turns around the rotation axis C3. The angle of the footstep 17 with respect to the movable bars 48 is changed. Further, a stopper 45, which is used to restrict the rotational movement of the footstep 17, is also provided. The stopper 45 prevents the tip of the footstep 17 from being excessively lowered. With the stopper 45, the inclination angle of the footstep 17 is maintained even in the state where the front assisting wheels 41 are away from the ground. Therefore, the footstep 17 is raised by driving the movable bars 48. That is, the footstep 17 is lifted and comes off the ground by rotationally driving the movable bars 48.

In this example, the worm gearwheel 44 is disposed between the motor 42 and the movable bars 48. Therefore, the driving force of the motor 42 is transferred to the movable bars 48 through the worm gearwheel 44. The worm wheel of the worm gearwheel 44 is disposed on the movable bar 48 side and the worm is disposed on the motor 42 side. By disposing the worm gearwheel 44 in this manner, the back-drivability can be eliminated. Therefore, it is possible to prevent the movable bars 48 from rotating at unintended timing. As a result, the angle of the movable bars 48 can be precisely controlled.

The unit structure of the backward bar 15 is substantially the same as that of the forward bar 14 except the presence/absence of the footstep 17 and the stopper 45. That is, since the footstep 17 is not provided in the backward bar 15, the stopper is also not provided in the backward bar 15. The configuration and operation of the backward bar 15 other than this feature are fundamentally the same as those of the forward bar 14. In the unit of the backward bar 15, rear assisting wheels 51, a motor 52, a speed reducer 53, a worm gearwheel 54, bolts 56, a base 57, movable bars 58 are provided.

The bolts 56 fixes the base 57 to the base plate 23. That is, the base 57 is placed on the base plate 23 by the bolts 46. The motor 52, which is used to drive the movable bars 58, is provided on the base 57. The motor 52 is coupled to the speed reducer 53. The speed reducer 53 is coupled to the worm gearwheel 54. The worm gearwheel 54 rotatably supports the movable bars 58. The driving force from the motor 52 is transferred to the movable bars 58 through the speed reducer 53 and the worm gearwheel 54. In this way, the movable bars 58 are rotationally driven around the drive shaft C4. The drive shaft C4 is parallel to Y-direction. The angle of the movable bars 58 with respect to the base 47 is changed.

Further, the rear assisting wheels 51 for preventing toppling-over are attached at the tip of the movable bar 58. In this example, two front assisting wheels 51 that are disposed away from each other in Y-direction are provided. The rear assisting wheels 51 rotate around the rotation axis C5. The rotation axis C5 is parallel to Y-direction. Even when the vehicle 100 inclines backward excessively, the vehicle 100 is prevented from toppling over in the backward direction because the rear assisting wheel 51 touches the ground. Further, the distance between the rear assisting wheels 51 and the ground surface is changed by rotating the movable bars 58 around the drive shaft C4 while the vehicle is traveling in the inverted state. For example, when the movable bars 58 are rotated downward, the distance between the rear assisting wheels 51 and the ground surface becomes shorter, whereas when the movable bars 58 are rotated upward, the distance between the rear assisting wheels 51 and the ground surface becomes longer. Of the rotational directions of the movable bars 58, the direction with witch the distance between the rear assisting wheels 51 and the ground surface becomes shorter is defined as "approaching direction", and the direction opposite to that direction is defined as "separating direction". That is, the approaching direction is the direction along which the front-end side of the movable bar 58 (rear assisting wheel 51 side) moves downward with respect to the base side (worm gearwheel 54 side). The separating direction is the direction along which the front-end side of the movable bar 58 (rear assisting wheel 51 side) moves upward with respect to the base side (worm gearwheel 54 side).

In this example, the worm gearwheel 54 is disposed between the motor 52 and the movable bars 58. Therefore, the driving force of the motor 52 is transferred to the movable bars 58 through the worm gearwheel 54. The worm wheel of the worm gearwheel 54 is disposed on the movable bar 58 side and the worm is disposed on the motor 52 side. By disposing the worm gearwheel 54 in this manner, the back-drivability can be eliminated. Therefore, it is possible to prevent the movable bars 58 from rotating at unintended timing. As a result, the angle of the movable bars 58 can be precisely controlled.

At the timing when the inversion is started and the timing when the inversion is finished, the motor 42 provided in the forward bar 14 and the motor 52 provided in the backward bar 15 are driven in synchronization with each other. That is, the control box 32 controls the motor 42 and the motor 52 so that the movable bars 48 and the movable bars 58 are simultaneously driven. In this way, the angle of the movable bars 48 and the angle of the movable bars 58 with respect to the base plate 23 are gradually changed. By causing the motor 42 to rotationally drive the forward bar 14, the transition of the front assisting wheels 41 between the ground-touching state and the off-the-ground state can be controlled. Further, by causing the motor 52 to rotationally drive the backward bar 15, the transition of the rear assisting wheels 51 between the ground-touching state and the off-the-ground state can be controlled. That is, the transition between the stable state and the inverted state is controlled by the operation of the motor 42 and the motor 52.

Figure 7:
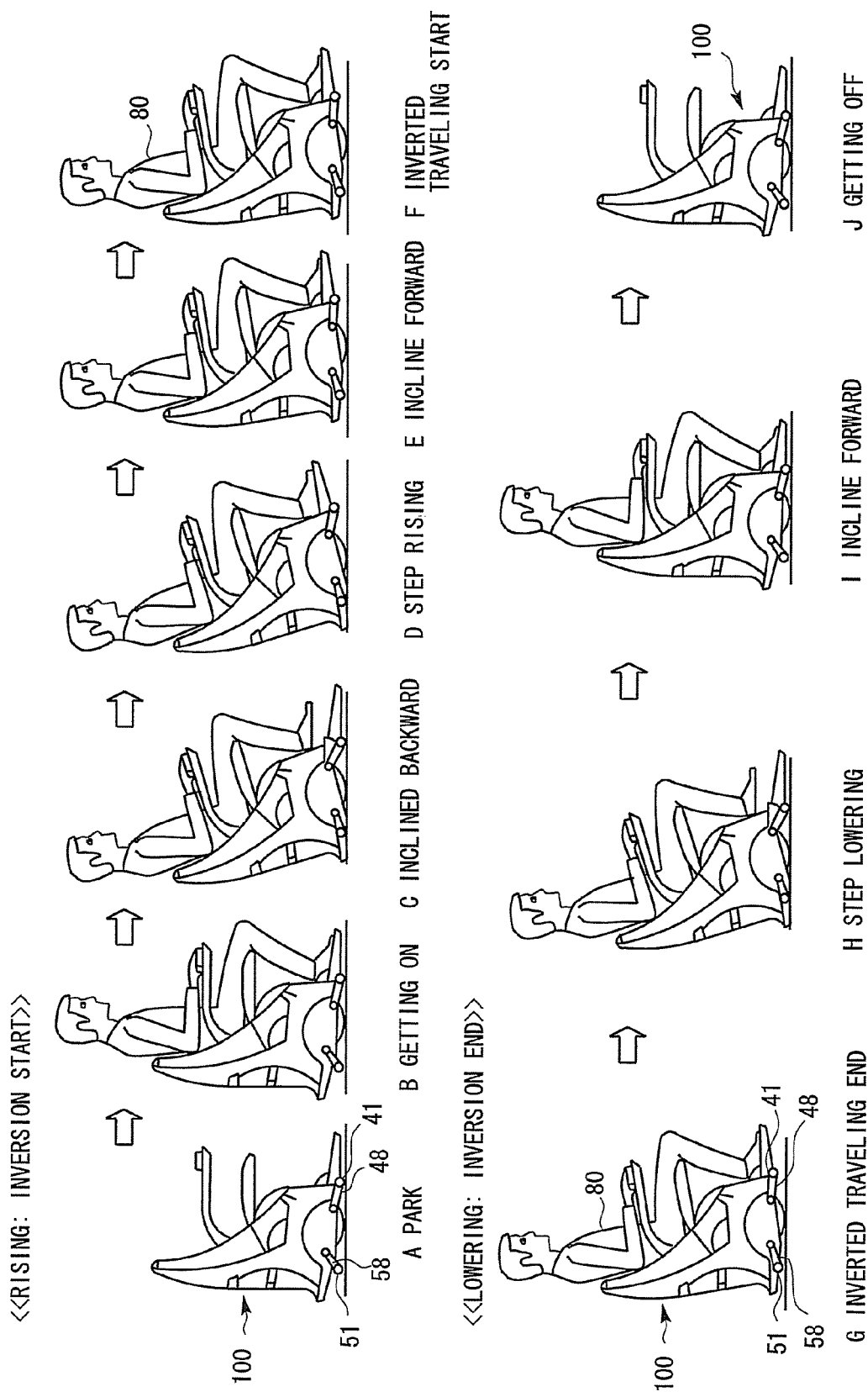
FIG. 7 is a side view for explaining a flow of an inversion start action and an inversion end action of a vehicle.

This operation of the motor 42 and the motor 52 is explained hereinafter with reference to FIG. 7. FIG. 7 is a figure for explaining an inversion start action and an inversion end action, in which the vehicle 100 is illustrated as viewed in the lateral direction. Further, the inversion start action is shown in the upper portion and the inversion end action is shown in the lower portion in FIG. 7. In each of these actions, the vehicle 100 is operated in sequence from left to right. That is, in the inversion start action, the posture of the vehicle 100 is changed in sequence from A to F of FIG. 7. Further, in the inversion end action, the posture of the vehicle 100 is changed in sequence from G to J of FIG. 7. Furthermore, in FIG. 7, the right side is the forward direction of the vehicle 100.

Firstly, the inversion start action is explained. At first, when no rider 80 is on the vehicle 100 and hence the vehicle 100 is in a parked state, the front assisting wheels 41 and the rear assisting wheels 51 are in contact with the ground (FIG. 7A). That is, the movable bars 48 and the movable bars 58 are put in a lowered state by the motor 42. When the vehicle 100 is parked, it is in a forward inclined posture. In this state, the rider 80 gets on the vehicle (FIG. 7B). Note that by putting the vehicle 100 in the forward inclined posture, the rider 80 can easily get on the vehicle.

Then, the rider 80 operates the operation module 21 to change the vehicle to an inversion mode. For example, when the rider 80 pushes an inversion start button provided in the operation module 21, the vehicle changes to the inversion mode. As a result, the vehicle 100 performs an inversion start action, and the vehicle 100 first has a backward inclined posture (FIG. 7C). The movable bars 48 of the forward bar 14 is driven in the approaching direction, while the movable bars 58 of the backward bar 15 is driven in the separating direction. That is, the vehicle 100 is brought into the backward inclined posture by operating the motor 42 and the motor 52 in synchronization with each other. In this case, the posture of the vehicle 100 is changed in such a direction that the front side of the vehicle 100 comes off the ground while the rear side gets closer to the ground. Note that during this action, the front assisting wheels 41 and the rear assisting wheels 51 remain in contact with the ground. When the posture is changed in this manner, the force exerted on the front assisting wheels 41 decreases while the force exerted on the rear assisting wheels 51 increases.

After that, the footstep 17 is raised by rotationally driving the movable bars 48 of the forward bar 14. That is, the movable bar 48 is rotated in the separating direction by driving the motor 42. In this way, the footstep 17 and the front assisting wheels 41 come off the ground while the vehicle is in the backward inclined posture. Further, since the vehicle has such a posture that the force exerted on the front assisting wheels 41 is small, the posture change caused by the rise of the footstep 17 is small. That is, the footstep 17 comes off the ground while the vehicle remains in the backward inclined posture. Note that the stopper 45, which is used to restrict the rotation of the footstep 17, is provided in the forward bar 14. Therefore, when the movable bars 48 are rotated in the separating direction by a certain angle, the footstep 17 comes off the ground.

After the footstep 17 is raised, the vehicle is brought into a forward inclined posture (FIG. 7E). That is, the movable bars 58 of the backward bar 15 are rotationally driven in the separating direction. In this way, the vehicle 100 gradually changes to the forward inclined posture. At this timing, the inverted pendulum control has already been started. Therefore, while the backward bar 15 is being rotationally driven, the right driving wheel 18 and the left driving wheel 20 are driven by the inverted pendulum control. That is, the right driving wheel 18 and the left driving wheel 20 rotate in order to maintain the inverted state. In this way, the movable bars 58 of the backward bar 15 are rotated in separating direction while controlling the right driving wheel 18 and the left driving wheel 20. As a result, the movable bars 58 can be lifted off the ground. That is, even when the movable bars 58 are rotated in the separating direction by a certain angle or larger, the right driving wheel 18 and the left driving wheel 20 are rotated backward. As a result, the position of the center of gravity is moved directly above the axle C1, and the inverted state is thereby maintained. Therefore, the unit of the backward bar 15 does not touch the ground any longer. Then, the traveling in an inverted state starts (FIG. 7F). By doing so, the transition from the parked mode to the inversion mode can be performed with simple control. The transition between the stable state and the inverted state can be smoothly performed. Further, since the front assisting wheels 41 and the rear assisting wheels 51 are in contact with the ground at the timing when a person gets on the vehicle, he/she can safely get on the vehicle.

Next, inversion end control is explained. That is, control performed at the transition from an inverted mode to a getting-off mode is explained. Firstly, the rider 80 operates the operation module 21 and pushes an inverted traveling end button (FIG. 7G). With this, control to finish the traveling in the inverted state starts. As a result, the movable bars 48 of the forward bar 14 and the movable bars 58 of the backward bar 15 are first rotated and the footstep 17 is thereby lowered (FIG. 7H). In this example, the movable bars 48 and the movable bars 58 are rotated in the approaching direction in synchronization with each other. As a result, the front assisting wheels 41 and the rear assisting wheels 51 touch the ground. Further, the footstep 17 is also in contact with the ground in this state. Then, the vehicle 100 is brought into a forward inclined posture by rotating the movable bars 58 of the backward bar 15. That is, the movable bars 58 are rotated in the approaching direction by driving the motor 52 while the movable bars 48 are rotated in the separating direction by driving the motor 42. Then, after the vehicle 100 is brought into the forward inclined posture, the rider 80 gets off the vehicle (FIG. 7J). By putting the vehicle in the forward inclined posture, the rider 80 can easily get off the vehicle. Note that the getting-off state shown in FIG. 7J is the same state as the parked state shown in FIG. 7A. In the getting-off state, since the front assisting wheels 41 and the rear assisting wheels 51 are in contact with the ground, the vehicle is in a stable state where the vehicle is stabilized at a standstill. Therefore, the rider 80 can safely get off the vehicle 100. By doing so, the transition from the parked mode to the inversion mode can be performed with simple control. The transition between the stable state and the inverted state can be smoothly performed.

As described above, the motor 42 and the motor 52 are controlled in synchronization with each other. In this way, the transition from the parked state to the inverted state as well as the transition from the inverted state to the parked state can be swiftly and safely performed. That is, the transition between the stable state where the vehicle 100 is stabilized at a standstill because the assisting wheels are in contact with the ground and the inverted state where the inverted state is maintained while the assisting wheels are away from the ground can be performed with ease. Since the strut, which extends and contracts in the forward/backward direction, becomes unnecessary, the vehicle 100 can be reduced in size. That is, the overall length of the vehicle in the forward/backward direction can be made shorter than that in the state where the strut is extended. Further, in the designing, the interference of the front and rear bar units with the footstep 17 and the chassis 12 can be easily avoided. Therefore, the degree of flexibility in the designing is improved. Further, since the height of the driving wheels does not need to be changed, the actuators and the like used for that purpose also become unnecessary. Therefore, the structure can be simplified and the weight can be reduced. Further, since the front assisting wheels 41 and the rear assisting wheels 51 are provided, the rotational driving can be easily performed even when being in contact with the ground.

Further, as described above, the footstep 17 is raised or lowered by the rotational driving of the movable bars 48. Therefore, when the rider 80 tries to get on (or get off) the vehicle in the parked state (or getting-off state), the footstep 17 has been lowered so as to touch the ground according to the rotational driving of the movable bars 48. Therefore, the rider 80 can get on (or get off) the vehicle with ease. Then, after the rider 80 gets on the vehicle (or before the rider 80 gets off the vehicle), the footstep 17 is raised (or lowered) according to the rotational driving of the movable bars 48. Therefore, in the transition between the stable state and the inverted state, the footstep 17 can be raised (or lowered) with a simpler structure.

Figure 8:
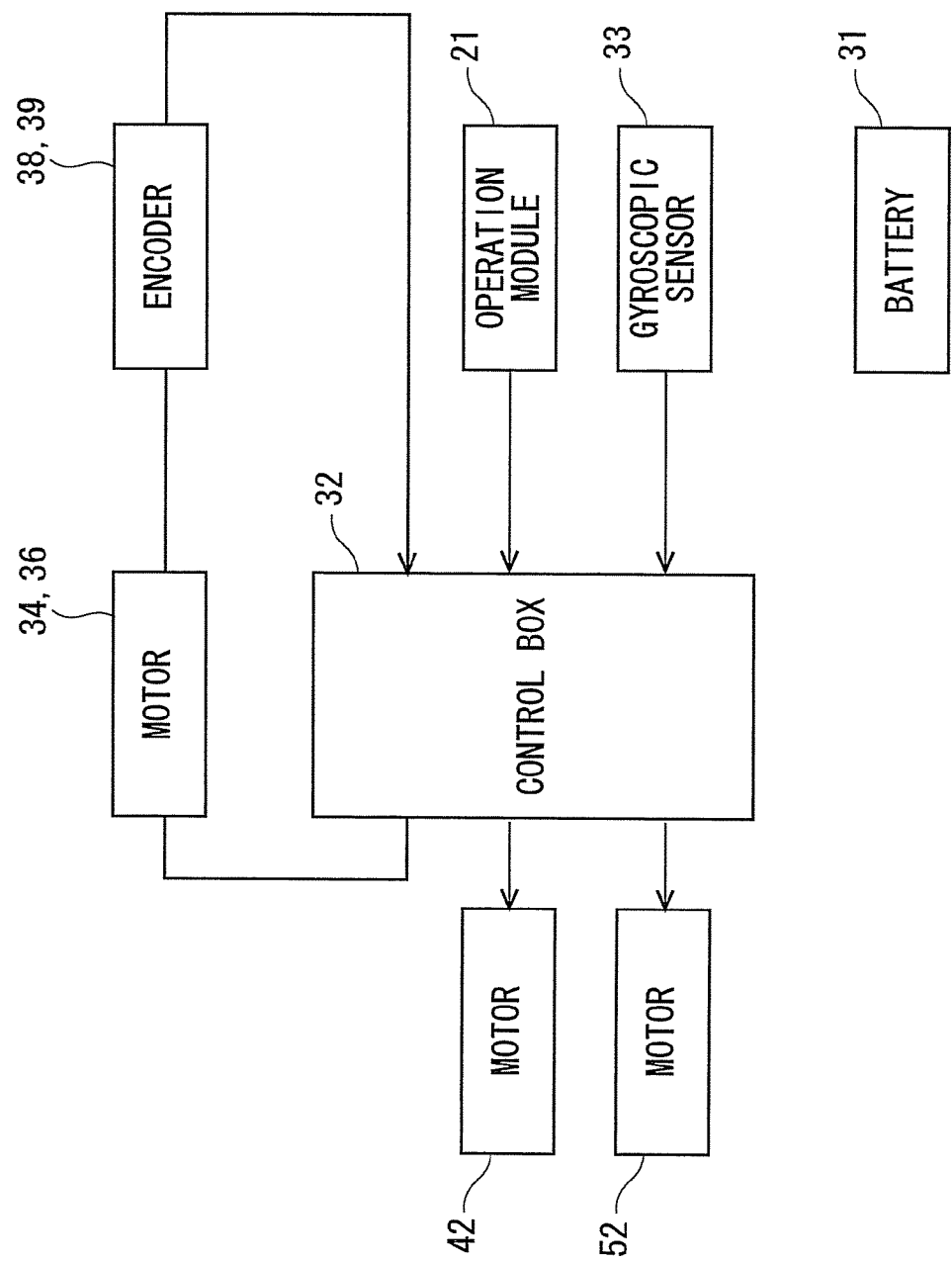
FIG. 8 is a block diagram showing a configuration of a control system of a vehicle in accordance with an exemplary embodiment of the present invention.

Next, a configuration of a control system of the vehicle 100 is explained with reference to FIG. 8. FIG. 8 is a block diagram showing a configuration of a control system including a control box 32.

A signal is supplied from a gyroscopic sensor 33 disposed in the vehicle body 22 to the control box 32. That is, an inclination angle detected by the gyroscopic sensor 33 is input to the control box 32. The gyroscopic sensor 33 is disposed, for example, in the vehicle body 22. Specifically, the gyroscopic sensor 33 is fixed on the chassis 12 near the coordinate center O. Further, an operation amount at the operation module 21 is also input to the control box 32. For example, a translation speed in the forward/backward direction, a turning speed in the left/right direction, and the like are input as an operation amount from the operation module 21. The rotation speeds of the motors 34 and 36 are also input from encoders 38 and 39 to the control box 32.

The control box 32 outputs a reference torque(s) to the motors 34 and 35, which are used to drive the right driving wheel 18 and the left driving wheel 20, based on these inputs. That is, the motor 34 rotationally drives the right driving wheel 18 according to the reference torque, while the motor 35 rotationally drives the left driving wheel 20 according to the reference torque. Note that the power from the motors 34 and 35 may be transferred to the right driving wheel 18 and the left driving wheel 20 through a pulley(ies) or the like.

The control box 32 performs inversion control calculation based on an operation amount from the operation module 21 and a detection signal from the gyroscopic sensor 33 to calculate a target control value. Further, the control box 32 calculates the deviation of the current rotation speed of the motor from the of the target rotation speed according to the target control value. Then, the control box 32 performs feedback control by multiplying this deviation by a predetermined feedback gain. The control box 32 outputs a reference value according to the drive torque of the motors 34 and 36 through an amplifier or the like. In this way, the vehicle 100 moves at a speed and in a direction according to the operation amount.

Further, the control box 32 controls the motor 42 and the motor 52 according to an operation made at the operation module 21. For example, when an inversion start operation is made at the operation module 21, the motor 42 and the motor 52 are driven to change the vehicle from a parked state to an inverted state. As a result, the forward bar 14 and the backward bar 15 are operated as shown in FIGS. 7A to 7F. Further, when an inversion end operation is made at the operation module 21, the motor 42 and the motor 52 are driven to change the vehicle from the inverted state to the parked state. As a result, the forward bar 14 and the backward bar 15 are operated as shown in FIGS. 7G to 7J. Needless to say, the motor 42 and the motor 52 may be equipped with an encoder so that feedback control can be performed.

Note that the battery 31 supplies an electrical power to various electric devices within the control box 32, the operation module 21, the gyroscopic sensor 33, the motors 34 and 35, the encoders 38 and 39, the motor 42, the motor 52, and the like. That is, all or some of the electric devices installed in the vehicle 100 are operated with a power-supply voltage supplied from the battery 31.

Further, when the detected angle of the vehicle body 22 detected by the gyroscopic sensor 33 exceeds a threshold, the vehicle changes from the inverted state to the getting-off state. That is, the front assisting wheels 41 and the rear assisting wheels 51 are lowered to the ground. For example, assume that a state where the vehicle body 22 is not inclined is expressed as "0°" and that there is a margin of 10° for each of the forward and backward directions. That is, the vehicle is designed such that the vehicle can incline ±10° from the mechanical restriction. In this case, when the inclination exceeds ±8°, the front assisting wheels 41 and the rear assisting wheels 51 are lowered to the ground by driving the forward bar 14 and the backward bar 15. In this way, if the inclination angle is increased due to the occurrence of an abnormality, the vehicle can be swiftly changed to the safe getting-off state. The motor 42 and the motor 52 are provided for the forward bar 14 and the backward bar 15, respectively, so that they are independently controlled. Further, the control box 32 controls the individual motors 42 and 52 in synchronization with each other. In this way, it is possible to perform appropriate motion control.

Although a two-wheeled vehicle is explained in the above-described example, the present invention is not limited to this example. That is, the present invention can be applied to one-wheeled vehicles and vehicles with three or more wheels.

Although the present invention is explained with reference to certain exemplary embodiments so far, the present invention is not limited to the above-described exemplary embodiments. Various modifications that can be understood by those skilled in the art can be made to the configuration and details of the present invention without departing from the scope of the present invention.

This application is based upon and claims the benefit of priority from Japanese patent application No. 2008-302314, filed on Nov. 27, 2008, the disclosure of which is incorporated herein in its entirety by reference.

INDUSTRIAL APPLICABILITY

The present invention relates to a vehicle and its control method, and, in particular, can be used for vehicles that move by inverted pendulum control and their control methods.

REFERENCE SIGNS LIST

10 Frame
11 Rider Seat
11a Seat
11b Seatback
12 Chassis
13 Cover
14 Forward Bar
15 Backward Bar
16 Armrest
17 Footstep
18 Right Driving Wheel
20 Left Driving Wheel
21 Operation Module
22 Vehicle Body
31 Battery
32 Control Box
33 Gyroscopic Sensor
34 Motor
36 Motor
38 Encoder
39 Encoder
41 Front Assisting Wheel
42 Motor
43 Speed Reducer
44 Worm Gearwheel
45 Stopper
46 Bolt
47 Base
48 Movable Bar
49 Speed Reducer
51 Front Assisting Wheel
52 Motor
53 Speed Reducer
54 Worm Gearwheel
56 Bolt
57 Base
58 Movable Bar
80 Rider
100 Vehicle
C1 Axle
C2 Drive Shaft
C3 Rotation Axis
C4 Drive Shaft
C5 Rotation Axis
O Coordinate Center

The invention claimed is:

1. A vehicle that moves by inverted pendulum control, comprising:
   a rider seat on which a rider rides:
   a chassis disposed below the rider seat;
   a wheel rotatably attached to the chassis;
   a first drive unit that rotationally drives the wheel;
   a forward movable bar protruding forward beyond the chassis;
   a second drive unit that rotationally drives the forward movable bar with respect to the chassis;
   a footstep rotatably supported on the forward movable bar, on which a foot of the rider is put; and
   a control unit that controls the second drive unit,
   wherein the control unit changes the vehicle to an inverted state by raising the footstep so that the footstep moves away from a ground, or changes the vehicle to a stable state by lowering the footstep so that the footstep touches the ground.

2. The vehicle according to claim 1, wherein a rotation axis of the forward movable bar is located below an axle of the wheel.

3. A vehicle that moves by inverted pendulum control, comprising:
   a rider seat on which a rider rides:
   a chassis disposed below the rider seat;
   a wheel rotatably attached to the chassis;
   a first drive unit that rotationally drives the wheel;
   a forward movable bar protruding forward beyond the chassis;
   a second drive unit that rotationally drives the forward movable bar with respect to the chassis;
   a footstep rotatably supported on the forward movable bar, on which a foot of the rider is put; and
   a backward movable bar protruding backward beyond the chassis;
   a third drive unit that rotationally drives the backward movable bar; and
   a control unit that controls the second and third drive units,
   wherein in at least one of a situation where the vehicle is changed to an inverted state by raising the footstep so that the footstep moves away from a ground and a situation where the vehicle is changed to a stable state by lowering the footstep so that the footstep touches the ground, the control unit controls the forward movable bar and the backward movable bar such that the forward movable bar and the backward movable bar are rotated in synchronization with each other.

4. The vehicle according to claim 3, further comprising an assisting wheel rotatably provided in at least one of the forward movable bar and the backward movable bar.

5. The vehicle according to claim 1, further comprising a stopper that restricts rotation of the footstep.

6. A control method of a vehicle that moves by inverted pendulum control, the vehicle comprising a rider seat on which a rider rides, a chassis disposed below the rider seat, and a wheel rotatably attached to the chassis, a forward movable bar that protrudes forward beyond the chassis and rotates with respect to the chassis, and a footstep rotatably supported on the forward movable bar, on which a foot of the rider is put, the control method comprising:

rotationally driving a forward movable bar protruding forward from the chassis; and changing the vehicle to an inverted state by raising a footstep so that the footstep moves away from a ground, or changing the vehicle to a stable state by lowering the footstep so that the footstep touches the ground by rotationally driving the forward movable bar, the footstep being attached to the forward movable bar, a foot of the rider being put on the footstep.

7. A control method of a vehicle that moves by inverted pendulum control, the vehicle comprising a rider seat on which a rider rides, a chassis disposed below the rider seat, a wheel rotatably attached to the chassis, a forward movable bar protruding forward from the chassis, a footstep attached to the forward movable bar, on which a foot of the rider is put, and a backward movable bar protruding backward from the chassis, the control method comprising:

rotationally driving the forward movable bar and the backward movable bar in synchronization with each other;

changing the footstep and the backward movable bar from a state where the footstep and the backward movable bar are in contact with the ground to a state where the footstep and the backward movable bar are away from the ground, or changing the footstep and the backward movable bar from a state where the footstep and the backward movable bar are away from the ground to a state where the footstep and the backward movable bar are in contact with the ground by rotationally driving the forward movable bar and the backward movable bar in synchronization with each other.

8. The control method of a vehicle according to claim 7, wherein after the vehicle is brought into a backward inclined posture by driving the forward movable bar and the backward movable bar in synchronization with each other, the forward movable bar is moved away from the ground, and after the forward movable bar is moved away from the ground, the backward movable bar is moved from the ground by rotationally driving the backward movable bar while performing inverted pendulum control.

9. The control method of a vehicle according to claim 6, wherein a rotation axis of the forward movable bar is located below an axle of the wheel.

* * * * *